United States Patent
Huang et al.

(10) Patent No.: US 8,138,297 B2
(45) Date of Patent: Mar. 20, 2012

(54) MOISTURE-CURABLE SILYLATED POLYMER POSSESSING IMPROVED STORAGE STABILITY

(75) Inventors: Misty Weiyu Huang, New City, NY (US); Christine Lacroix, Ornex (FR)

(73) Assignee: Momentive Performance Materials Inc., Albany, NY (US)

(*) Notice: Subject to any disclaimer, the term of this patent is extended or adjusted under 35 U.S.C. 154(b) by 0 days.

(21) Appl. No.: 12/322,882

(22) Filed: Feb. 9, 2009

(65) Prior Publication Data

US 2010/0204384 A1    Aug. 12, 2010

(51) Int. Cl.
*C08L 83/00* (2006.01)

(52) U.S. Cl. ............... 528/38; 528/26; 528/30; 528/59; 528/69

(58) Field of Classification Search .................... 524/588
See application file for complete search history.

(56) References Cited

U.S. PATENT DOCUMENTS

| | | | |
|---|---|---|---|
| 4,555,561 A | 11/1985 | Sugimori et al. | |
| 5,068,304 A | 11/1991 | Higuchi et al. | |
| 5,990,257 A | 11/1999 | Johnston et al. | |
| 6,197,912 B1 | 3/2001 | Huang et al. | |
| 7,307,134 B2 * | 12/2007 | Lim et al. | 528/34 |
| 2007/0060732 A1 * | 3/2007 | Yang et al. | 528/44 |

FOREIGN PATENT DOCUMENTS

| | | |
|---|---|---|
| EP | 0 931 800 A1 | 7/1999 |
| WO | WO 2008/109145 A1 | 9/2008 |

* cited by examiner

*Primary Examiner* — Marc Zimmer
*Assistant Examiner* — Lindsay Nelson
(74) *Attorney, Agent, or Firm* — Dominick G. Vicari; Joseph S. Ostroff

(57) ABSTRACT

A moisture-curable silylated resin possessing improved storage stability and short cure time is obtained by reacting a prepolymer with a silylating reactant comprising silane (i) possessing three methoxy groups, silane (ii) possessing three alkoxy groups independently containing from 2 to 4 carbon atoms, and, optionally, silane (iii) possessing two methoxy groups and one alkoxy group of from 2 to 4 carbon atoms and/or silane (iv) possessing one methoxy group and two alkoxy groups independently containing from 2 to 4 carbon atoms.

18 Claims, No Drawings

MOISTURE-CURABLE SILYLATED POLYMER POSSESSING IMPROVED STORAGE STABILITY

BACKGROUND OF THE INVENTION

The present invention relates to moisture-curable silylated, i.e., silane end-capped, polymers, e.g., polyurethane prepolymers, possessing improved storage stability and to moisture-cured compositions obtained therefrom.

It is known to modify polymers, e.g., polyurethane prepolymers, by reaction with any of a variety of hydrolyzable organofunctional silanes. Moisture-curable silylated polymers, notably, silylated polyurethane prepolymers, have found widespread application as adhesives, sealants and coatings for which cure time and storage stability are important, even critical, functional properties.

Polymers silylated with silanes possessing trimethoxy groups exhibit desirable cure time and deep section cure. Methoxysilanes with reactive organofunctional groups have often been selected for use in silylating polymers. However, the moisture-curable silylated polymers can be difficult to process and often exhibit poor storage stability which manifests itself as an increase in the viscosity of the formulated adhesive, sealant or coating compositions containing them and often results in premature gelation and/or poor gunnability or sprayability of the compositions. Moisture-curable polymers containing only trimethoxysilyl groups react readily with ambient moisture that is present in many of the components used to formulate adhesive, sealant and coating compositions. Wetting agents, fillers, prepolymer, and the like, may contain amounts of absorbed and/or adsorbed water in quantities sufficient to result in premature gelation or viscosity increases even after storage for relatively short periods, e.g., days or a few weeks. In order to provide a storage-stable product, it is common practice to carefully dry each moisture-containing component of an adhesive, sealant or coating composition containing a moisture-curable silylated resin, mixing the components under moisture-free conditions and storing the composition in a suitably dry environment. However, mixers require special equipment to provide for an inert atmosphere. The use of thoroughly dried components and the special handling required during production of the aforesaid adhesives, sealants and coating compositions adds cost to their manufacture and may still result in unusable products due to premature gelation and/or poor gunnability or sprayability. While moisture-curable silylated polymers that contain alkoxysilyl groups wherein the alkoxy groups have two or more carbon atoms provide for good storage-stability, they generally exhibit poor cure times and poor deep section cures even when large amounts of hydrolysis and condensation catalysts are included in the fully formulated compositions.

SUMMARY OF THE INVENTION

In accordance with the present invention, a moisture-curable silylated polymer is obtained by reacting a prepolymer with a silylating reactant comprising silane (i) possessing three methoxy groups, silane (ii) possessing three alkoxy groups independently containing from 2 to 4 carbon atoms, and, optionally, silane (iii) possessing two methoxy groups and one alkoxy group of from 2 to 4 carbon atoms and/or silane (iv) possessing one methoxy group and two alkoxy groups independently containing from 2 to 4 carbon atoms. The silylated polymers of the present invention have a storage-life of at least six months and preferably at least one year and a cure time ranging from substantially the same as up to three times, preferably less than two times, and more preferably substantially the same as, the cure time of silylated polymers obtained by reacting substantially the same prepolymer with silane (i) as the sole silylating reactant.

The moisture-curable silylated polymers herein exhibit good cure time and significantly prolonged storage-life making them stable during mixing with undried fillers and other components and ideally useful in adhesive, sealant and coating compositions.

DETAILED DESCRIPTION OF THE INVENTION

The terms "stable" and "stability" as applied to the moisture-curable composition of the invention shall be understood to mean that in the mixing stage when fillers and other components that have not been previously dried are utilized, and in the packaged state, at ambient temperature and over its expected storage-life, the composition will not undergo any significant degree of chemical change, e.g., there will be no appreciable gelation of its moisture-curable silylated polymer component(s), significant increase in the viscosity of the composition during storage and/or any appreciable change in the physical characteristics of the components of the composition.

The term "storage-life" as applied to the moisture-curable composition of the invention shall be understood to mean the time period, following the manufacture of the fully formulated composition and a subsequent period of its storage that the composition can still be processed and used for its intended application, e.g., as an adhesive, sealant or coating.

The term "cure time" shall be understood herein to mean the time required by a moisture-curable composition upon its initial exposure to moisture to undergo hydrolysis and subsequent condensation to provide a tack-free, dry-to-the-touch, moisture-cured composition as measured in accordance with ASTM C679-03 Standard Test Method for Tack-Free Time of Elastomeric Sealants.

According to the invention, the storage-life of a moisture-curable composition formulated with the silylated polymer in accordance with the invention can be increased by as much as six months to even a year or more, as measured by storage-stability testing, while the cure time of such composition can be less than, about the same as or up to four times longer than the cure time of a similarly formulated moisture-curable composition but one whose silylated polymer component contains an equivalent molar amount of methoxy groups to the exclusion of all other alkoxy groups.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all subranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The reactant for silylating the precursor polymer, or prepolymer, is a mixture of silane (i) and silane (ii) and, optionally, silane (iii) and/or silane (iv), which contain functionality that is reactive with the precursor polymer and wherein silane (i) contains three methoxy groups, silane (ii) contains three alkoxy groups independently containing from 2 to 4 carbon atoms, silane (iii) contains two methoxy groups and one alkoxy group containing from 2 to 4 carbon atoms and silane (iv) contains one methoxy group and two alkoxysilyl groups independently containing from 2 to 4 carbon atoms.

According to certain specific embodiments of the invention, the silylated polymer herein is at least one reaction product of precursor polymer possessing reactive functional groups ("prepolymer") with a silylating reactant capable of reacting with the functional groups, the silylating reactant being a mixture comprising silanes (i) and (ii) and, optionally, silane (iii) and/or silane (iv), of the formulae:

$$XR^1Si(OCH_3)_3 \quad (i)$$

$$XR^1Si(OR^2)_3 \quad (ii)$$

$$XR^1Si(OCH_3)_2(OR^2) \quad (iii)$$

$$XR^1Si(OCH_3)(OR^2)_2 \quad (iv)$$

wherein:

each occurrence of X is independently a reactive functional group selected from the group comprising —SH, —NHR$^3$, —NHCH(CO$_2$R$^4$)CH$_2$CO$_2$R$^4$, —NHC(=O)NH$_2$, —NCO and —H, with the proviso that when X is —H, R$^1$ is a chemical bond;

each occurrence of R$^1$ is independently a chemical bond or a divalent hydrocarbon group of from 1 to 18 carbon atoms, and optionally containing one or more heteroatoms selected from the group consisting of oxygen, nitrogen and sulfur, with the proviso that when R$^1$ is a chemical bond, X is —H;

each occurrence of R$^2$ is a monovalent alkyl group independently containing from 2 to 4 carbon atoms;

each occurrence of R$^3$ is independently hydrogen, a monovalent hydrocarbon group of from 1 to 8 carbon atoms or —R$^5$Si(OCH$_3$)$_x$(OR$^6$)$_{3-x}$;

each occurrence of R$^4$ is independently hydrogen or a monovalent hydrocarbon group of from 1 to 8 carbon atoms;

each occurrence of R$^5$ is independently a divalent hydrocarbon group of from 1 to 18 carbon atoms, and optionally containing one or more heteroatoms selected from the group consisting of oxygen, nitrogen and sulfur;

each occurrence of R$^6$ is a monovalent alkyl group independently containing from 2 to 4 carbon atoms; and, each occurrence of x is independently an integer of from 0 to 3.

The moisture-curable silylated polymer composition of the present invention comprises silylated polymer that on exposure to moisture undergoes hydrolysis and subsequent condensation to provide a cured resin having properties which, depending on the specific formulation of the composition, make it useful for such applications as adhesives, sealants and coatings.

The precursor polymer from which the silylated polymer herein is derived can be any of those heretofore known for use in the manufacture of moisture-curable polymers. Suitable precursor polymers include hydroxyl-terminated and isocyanate-terminated polyurethane prepolymers derived from, e.g., polyether polyols, polyester polyols, polyetherester polyols, polyesterether polyols, hydroxyl-containing acrylic polymers, isocyanate-terminated and amine-terminated polyurethane-polyurea (poly(urethane-urea) or polyurethaneurea) prepolymers and polyurea prepolymers derived from polyamines. Silylated polymers can be obtained by silylating these and similar precursor polymers in any known or conventional manner, e.g., a hydroxyl-terminated precursor polymer can be silylated by reaction with a mixture of isocyanatoalkoxysilanes (i) and (ii) and an isocyanate-terminated polymer can be silylated by reaction with a mixture of alkoxysilanes (i) and (ii) possessing functionality that is reactive with isocyanate such as mercapto, ureido or amino functionality.

The precursor polymers from which the silylated polymer of the invention is derived also include olefinically unsaturated polymers that are capable of undergoing hydrosilation under hydrosilation reaction conditions with a mixture of hydridosilanes (i) and (ii), e.g., polyolefins and polyethers possessing terminal olefinic unsaturation. Silylated polyether polymers can be obtained by silylating these and similar precursor polymers in any known or conventional manner.

In one embodiment, preparation of moisture-curable silylated polyols in accordance with the invention can be carried out by silylating hydroxyl-terminated polyurethane prepolymer with a mixture of silanes (i) and (ii) and, optionally, silane (iii) and/or silane (iv), wherein said silanes contain an isocyanate group. Hydroxyl-terminated polyurethane prepolymer can be obtained in a known or conventional manner by reacting an excess of polyol, e.g., diol, with polyisocyanate, e.g., a diisocyanate, optionally, in the presence of catalyst(s) such as condensation catalyst(s), such that the resulting prepolymer will possess hydroxyl functionality. In the case of polyols which are diols and polyisocyanates which are diisocyanates, a molar excess of diol(s) is employed.

Isocyanate-terminated prepolymer can be obtained by reacting the aforesaid polyol and polyisocyanates in such proportions that the resulting prepolymer will possess isocyanate functionality. In the case of reacting a diol with a diisocyanate, a molar excess of diisocyanate is employed.

Included among the polyols that can be utilized for the preparation of hydroxyl-terminated and isocyanate-terminated polyurethane prepolymers are polyether polyols, polyester polyols such as the hydroxyl-terminated polycaprolactones, polyetherester polyols such as those obtained from the reaction of polyether polyol with e-caprolactone and polyesterether polyols such as those obtained from the reaction of hydroxyl-terminated polycaprolactones with one or more alkylene oxides such as ethylene oxide and propylene oxide. Representative non-limiting examples of suitable polyols include the poly(oxyalkylene)ether diols (i.e., polyether diols), in particular, the poly(oxyethylene)ether diols, the poly(oxypropylene)ether diols and the poly(oxyethylene-oxypropylene)ether diols, poly(oxyalkylene)ether triols, poly(tetramethylene)ether glycols, polyacetals, polyhydroxy polyacrylates, polyhydroxy polyester amides, polyhydroxy polythioethers, polycaprolactone diols and triols, and the like.

The polyols used in the production of the hydroxyl-terminated polyurethane prepolymers and isocyanate-terminated polyurethane prepolymers include poly(oxyethylene)ether diols with number average molecular weights (M$_n$) between about 500 grams per mole and 25,000 grams per mole. Mixtures of polyols of various structures, molecular weights and/or functionalities can also be used.

The polyether polyols can have a functionality up to about 8 but advantageously have a functionality of from 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420 and 5,266,681, the entire contents of which are incorporated herein by reference. Polyether polyols produced in the presence of such catalysts tend to have high molecular weights and low levels of unsaturation, properties of which, it is believed, are responsible for the improved performance of inventive retroreflective articles. The polyether polyols preferably have a number average molecular weight (Mn) of from about 1,000 grams per mole to about 25,000 grams per mole, more preferably from about 2,000 grams per mole to about 20,000 grams per mole, and even more preferably from about 4,000 grams per mole to about 18,000 grams per mole.

Representative non-limiting examples of commercially available diols that are suitable for making the hydroxyl-terminated and isocyanate-terminated polyurethane prepolymers include, but are not limited to, Acclaim 8200 (number average molecular weight of 8000 grams per mole), Acclaim 12200 (number average molecular weight of 12000 grams per mole, ARCOL R-1819 (number average molecular weight of 8,000 grams per mole), ARCOL E-2211 (number average molecular weight of 11,000 grams per mole), ARCOL E-2204 (number average molecular weight of 4,000 grams per mole), available from Bayer Material Science.

The polyols can contain one or more chain extenders, such as simple glycols, and/or one or more other polyols of a different type.

Any of numerous polyisocyanates, advantageously, diisocyanates, and mixtures thereof, can be used to provide hydroxyl-terminated and isocyanate-terminated polyurethane prepolymers. Suitable organic polyisocyanates include any of the known and conventional organic polyisocyanates, especially organic diisocyanates, from which polyurethane polymers have heretofore been prepared. Useful non-limiting diisocyanates include, for example, 2,4-toluene diisocyanate, 2,6-toluene diisocyanate, 4,4' diphenyl-methanediisocyanate, isophorone diisocyanate, dicyclohexylmethane-4,4'-diisocyanate, various liquid diphenylmethane-diisocyanates containing a mixture of 2,4- and 4,4' isomers, Desmodur N® (Bayer) and the like, and mixtures thereof. Isophorone diisocyanate is especially advantageous fore use in preparing the polyurethane prepolymers herein.

In one embodiment, the silylating reactant for reaction with precursor polymer is a mixture of silane (i) and (ii) and, optionally, silane (iii) and silane (iv), wherein the molar ratio of silane (i) to silane (ii) is in the range of 5:1 to 1:5, preferably from 3:1 to 1:3 and most preferably from 2:1 to 1:2.

It is preferred that the silylating reactant mixture of silanes (i) and (ii) also contain optional silane (iii) and/or silane (iv). The preferred amounts in molar percent of such mixture are from 15 to 85, more preferably from 20 to 75, and most preferably from 25 to 60, mole percent of silane (i); from 15 to 85, more preferably from 20 to 75, and most preferably from 25 to 60, mole percent silane (ii); from 1 to 45, more preferably from 5 to 30, and most preferably from 10 to 20, mole percent silane (iii); and, from 1 to 45, more preferably from 5 to 30, and most preferably from 10 to 20, mole percent silane (iv).

It is to be understood that the mixture of silane (i) and silane (ii) and, optionally, silane (iii) and/or silane (iv), can react with the prepolymer to form a mixture of silylated polymers in which all, or less than all, of the possible silylated polymer reaction products are obtained. The amount of each silylated polymer product obtained will depend on the composition of the silylating agent i.e., the specific amounts of each silane in the mixture of silanes (i) and (ii) and, optionally, silane (iii) and/or silane (iv).

Representative non-limiting examples of silanes (i) for use herein include 2-mercaptoethyltrimethoxysilane, 3-mercaptopropyltrimethoxysilane, 4-mercaptobutyltrimethoxysilane, 3-mercaptobutyltrimethoxysilane, 3-mercapto-2-methylpropyltrimethoxysilane, 3-mercaptocyclohexyltrimethoxysilane, 12-mercaptododecyltrimethoxysilane, 18-mercaptooctadecyltrimethoxysilane, 2-mercaptophenyltrimethoxysilane, 2-mercaptotolyltrimethoxysilane, 1-mercaptomethyltolyltrimethoxysilane, 2-mercaptoethylphenyltrimethoxysilane, 2-mercaptoethyltolyltrimethoxysilane, 3-mercaptopropylphenyltrimethoxysilane, 3-aminopropyltrimethoxysilane, N-methyl-3-amino-2-methylpropyltrimethoxysilane, N-ethyl-3-amino-2-methylpropyltrimethoxysilane, N-butyl-3-aminopropyltrimethoxysilane, 3-(N-methyl-2-amino-1-methyl-1-ethoxy)-propyltrimethoxysilane, N-ethyl-4-amino-3,3-dimethylbutyltrimethoxysilane, N-(cyclohexyl)-3-aminopropyltrimethoxysilane, bis-(3-trimethoxysilpropyl)amine, bis-(3-trimethoxysilyl-2-methylpropyl)amine, N-(3-trimethoxysilylpropyl)-3-amino-2-methylpropyltrimethoxysilane, 2-(trimethoxysilanylmethyl-amino)-succinic acid dimethyl ester, 2-(trimethoxysilanylmethyl-amino)-succinic acid diethyl ester, 2-(trimethoxysilanylmethyl-amino)-succinic acid dibutyl ester, 2-(trimethoxysilanyl-ethylamino)-succinic acid dimethyl ester, 2-(trimethoxysilanyl-propylamino)-succinic acid dimethyl ester, 2-(trimethoxysilanyl-propylamino)-succinic acid diethyl ester, 2-(trimethoxysilanyl-propylamino)-succinic acid dibutyl ester, ureidomethyltrimethoxysilane, 2-ureidoethyltrimethoxysilane, 3-ureidopropyltrimethoxysilane, 6-ureidohexyltrimethoxysilane, isocyanatomethyltrimethoxysilane, 2-isocyanatoethyltrimethoxysilane, 3-isocyanatopropyltrimethoxysilane, and the like.

Representative non-limiting examples of silanes (ii) for use herein include 2-mercaptoethyltriethoxysilane, 3-mercaptopropyltriethoxysilane, 4-mercaptobutyltriethoxysilane, 3-mercaptobutyltriethoxysilane, 3-mercapto-2-methylpropyltriethoxysilane, 3-mercaptocyclohexyltriethoxysilane, 12-mercaptododecyltriethoxysilane, 18-mercaptooctadecyltripropoxysilane, 2-mercaptophenyltributoxysilane, 2-mercaptotolyltriethoxysilane, 1-mercaptomethyltolyltriethoxysilane, 2-mercaptoethylphenyltriethoxysilane, 2-mercaptoethyltolyltriethoxysilane, 3-mercaptopropylphenyltri-isopropoxysilane, 3-aminopropyltriethoxysilane, N-methyl-3-amino-2-methylpropyltriethoxysilane, N-ethyl-3-amino-2-methylpropyltriethoxysilane, N-butyl-3-aminopropyltriethoxysilane, 3-(N-methyl-2-amino-1-methyl-1-ethoxy)-propyltripropoxysilane, N-ethyl-4-amino-3,3-dimethylbutyltriethoxysilane, N-(cyclohexyl)-3-aminopropyltriethoxysilane, bis-(3-triethoxysilpropyl)amine, bis-(3-triethoxysilyl-2-methylpropyl)amine and N-(3-triethoxysilylpropyl)-3-amino-2-methylpropyltri-ethoxysilane, 2-(triethoxysilanylmethyl-amino)-succinic acid dimethyl ester, 2-(triethoxysilanylmethyl-amino)-succinic acid diethyl ester, 2-(triethoxysilanylmethyl-amino)-succinic acid dibutyl ester, 2-(triethoxysilanyl-ethylamino)-succinic acid dimethyl ester, 2-(triethoxysilanyl-propylamino)-succinic acid dimethyl ester, 2-(triethoxysilanyl-propylamino)-succinic acid diethyl ester, 2-(triethoxysilanyl-propylamino)-succinic acid dibutyl ester, ureidomethyltriethoxysilane, 2-ureidoethyltriethoxysilane, 3-ureidopropyltriethoxysilane, 6-ureidohexyltriethoxysilane, isocyanatomethyltriethoxysilane, 2-isocyanatoethyltriethoxysilane, 3-isocyanatopropyltriethoxysilane, 3-isocyanatopropyltri-n-propoxysilane, 3-isocyanatopropyltri-n-butoxysilane, 3-isocyanatopropyltri-isopropoxysilane, 3-isocyanatopropyltri-sec-butoxysilane, 3-isocyanatopropyltriisopropoxysilane, and the like.

Representative non-limiting examples of silanes (iii) for use herein include 2-mercaptoethyldimethoxyethoxysilane, 3-mercaptopropyldimethoxyethoxysilane, 4-mercaptobutyldimethoxyethoxysilane, 3-mercaptobutyldimethoxyethoxysilane, 3-mercapto-2-methylpropyldimethoxyethoxysilane, 3-mercaptocyclohexyldimethoxyethoxysilane, 12-mercaptododecyldimethoxyethoxysilane, 18-mercaptooctadecyldimethoxyethoxysilane, 2-mercaptophenyldimethoxyethoxysilane, 2-mercaptotolyldimethoxyethoxysilane, 1-mercaptomethyltolyldimethoxyethoxysilane, 2-mercaptoethylphenyldimethoxyethoxysilane, 2-mercaptoethyltolyldimethoxyethoxysilane, 3-mercaptopropylphenyldimethoxyethoxysilane, 3-aminopropyldimethoxyethoxysilane, N-methyl-3-amino-2-methylpropyldimethoxyethoxysilane, N-ethyl-3-amino-2-methylpropyldimethoxyethoxysilane, N-butyl-3-aminopropyldimethoxyethoxysilane, 3-(N-methyl-2-amino-1-methyl-1-ethoxy)-propyldimethoxyethoxysilane, N-ethyl-4-amino-3,3-dimethylbutyldimethoxyethoxysilane, N-(cyclohexyl)-3-aminopropyldimethoxyethoxysilane, bis-(3-dimethoxyethoxysilpropyl)amine, bis-(3-dimethoxyethoxysilyl-2-methylpropyl)amine and N-(3-dimethoxyethoxysilylpropyl)-3-amino-2-methylpropyldimethoxyethoxysilane, 2-(dimethoxyethoxysilanylmethyl-amino)-succinic acid dimethyl ester, 2-(dimethoxyethoxysilanylmethyl-amino)-succinic acid diethyl ester, 2-(dimethoxyethoxysilanylmethyl-amino)-succinic acid dibutyl ester, 2-(dimethoxyethoxysilanyl-ethylamino)-succinic acid dimethyl ester, 2-(dimethoxyethoxysilanyl-propylamino)-succinic acid dimethyl ester, 2-(dimethoxyethoxysilanyl-propylamino)-succinic acid diethyl ester, 2-(dimethoxyethoxysilanyl-propylamino)-succinic acid dibutyl ester, ureidomethyldimethoxyethoxysilane, 2-ureidoethyldimethoxyethoxysilane, 3-ureidopropyldimethoxyethoxysilane, 6-ureidohexyldimethoxyethoxysilane, isocyanatomethyldimethoxyethoxysilane, 2-isocyanatoethyldimethoxyethoxysilane, 3-isocyanatopropyldimethoxyethoxysilane, 3-isocyanatopropyldimethoxy-n-propoxysilane, 3-isocyanatopropyldimethoxy-n-butoxysilane, 3-isocyanatopropyldimethoxyisopropoxysilane, 3-isocyanatopropyldimethoxy-sec-butoxysilane, 3-isocyanatopropyldimethoxyisobutoxysilane, and the like.

Representative non-limiting examples of silanes (iv) for use herein include 2-mercaptoethylmethoxydiethoxysilane, 3-mercaptopropylmethoxydiethoxysilane, 4-mercaptobutylmethoxydiethoxysilane, 3-mercaptobutylmethoxydiethoxysilane, 3-mercapto-2-methylpropylmethoxydiethoxysilane, 3-mercaptocyclohexylmethoxydiethoxysilane, 12-mercaptododecylmethoxydiethoxysilane, 18-mercaptooctadecylmethoxydiethoxysilane, 2-mercaptophenylmethoxydiethoxysilane, 2-mercaptotolylmethoxydiethoxysilane, 1-mercaptomethyltolylmethoxydiethoxysilane, 2-mercaptoethylphenylmethoxydiethoxysilane, 2-mercaptoethyltolylmethoxydiethoxysilane, 3-mercaptopropylphenylmethoxydiethoxysilane, 3-aminopropylmethoxydiethoxysilane, N-methyl-3-amino-2-methylpropylmethoxydiethoxysilane, N-ethyl-3-amino-2-methylpropylmethoxydiethoxysilane, N-butyl-3-aminopropylmethoxydiethoxysilane, 3-(N-methyl-2-amino-1-methyl-1-ethoxy)-propylmethoxydiethoxysilane, N-ethyl-4-amino-3,3-dimethylbutylmethoxydiethoxysilane, N-(cyclohexyl)-3-aminopropylmethoxydiethoxysilane, bis-(3-methoxydiethoxysilpropyl)amine, bis-(3-methoxydiethoxysilyl-2-methylpropyl)amine and N-(3-methoxydiethoxysilylpropyl)-3-amino-2-methylpropylmethoxydiethoxysilane, 2-(methoxydiethoxysilanylmethyl-amino)-succinic acid dimethyl ester, 2-(methoxydiethoxysilanylmethyl-amino)-succinic acid diethyl ester, 2-(methoxydiethoxysilanylmethyl-amino)-succinic acid dibutyl ester, 2-(methoxydiethoxysilanyl-ethylamino)-succinic acid dimethyl ester, 2-(methoxydiethoxysilanyl-propylamino)-succinic acid dimethyl ester, 2-(methoxydiethoxysilanyl-propylamino)-succinic acid diethyl ester, 2-(methoxydiethoxysilanyl-propylamino)-succinic acid dibutyl ester, ureidomethylmethoxydiethoxysilane, 2-ureidoethylmethoxydiethoxysilane, 3-ureidopropylmethoxydiethoxysilane, 6-ureidohexylmethoxydiethoxysilane, isocyanatomethylmethoxydiethoxysilane, 2-isocyanatoethylmethoxydiethoxysilane, 3-isocyanatopropylmethoxydiethoxysilane, 3-isocyanatopropylmethoxy-di-n-propoxysilane, 3-isocyanatopropylmethoxy-di-n-butoxysilane, 3-isocyanatopropylmethoxydiisopropoxysilane, 3-isocyanatopropylmethoxy-di-sec-butoxysilane, 3-isocyanatopropylmethoxydiisobutoxysilane, and the like.

A catalyst will ordinarily be used in the preparation of the silylated polymers of the present invention. Advantageously, condensation catalysts are employed since these will also catalyze the cure (hydrolysis of the alkoxysilyl groups and condensation of the resulting silanols) of the silylated polymer component of the moisture-curable compositions of the invention. Suitable condensation catalysts include dialkyltin dicarboxylates such as dibutyltin dilaurate and dioctyltin dilaurate, tertiary amines, the stannous salts of carboxylic acids, such as stannous octoate and stannous acetate, and the like. Other useful catalysts include zirconium-containing, aluminum-containing, and bismuth-containing complexes such as KAT XC6212, K-KAT 5218 and K-KAT 348, supplied by King Industries, Inc., titanium chelates such as the TYZOR® types, available from DuPont company, and the KR types, available from Kenrich Petrochemical, Inc., and other organometallic catalysts, e.g., those containing a metal such as Al, Zn, Co, Ni, Fe, and the like.

Isocyanate-terminated polyurethane prepolymers are prepared by reacting an excess of organic polyisocyanate with one or more of the foregoing hydroxyl-terminated polymers, generally, in the presence of catalyst. As used herein, the term "polyisocyanate" means an organic compound possessing two or more isocyanate groups. The reaction temperature is typically in the range of from 60° to 90° C. and the reaction time is typically from 4 to 8 hours. The isocyanate-terminated polyurethane prepolymers are prepared with at least a slight mole excess of the isocyanate equivalents (NCO groups) employed to terminate the polyurethane prepolymer(s) with respect to the hydroxyl equivalents (OH groups). Advantageously, the molar ratio of NCO to OH is from 1.1:1 to 2.0:1.

Hydroxyl-terminated polyurethane prepolymers can be prepared by the reaction of an organic polyisocyanate, e.g., a diisocyanate, such as any of those mentioned above, and advantageously isophorone diisocyanate, with a stoichiometric excess of the selected polyol(s). Depending on the reactivity of the respective reactants, a catalyst such as any of those mentioned above can be employed. The reaction temperature is typically in the range of from 60° to 90° C. and the reaction time is typically on the order of from 2 to 8 hours. The reaction mixture can also contain one or more other polyols of different types such as any of those mentioned above.

To prepare the hydroxyl group-terminated polyurethane prepolymers, at least a slight molar excess of the hydroxyl equivalents (OH groups) with respect to the NCO isocyanate equivalents (NCO groups) is employed to terminate the polymer chains with hydroxyl groups. Advantageously, the molar ratio of NCO to OH is from 0.3 to 0.95, and more preferably from 0.5 to 0.70, depending on the specific polyols employed.

For many applications such as those used for sealing and coating, it is preferred that the silylated polyurethane polymer of the present invention be substantially fully silylated, i.e., all, or substantially all, of the isocyanate groups be reacted to provide a silylated polymer containing essentially no residual isocyanate groups.

For details of the silylation of other hydroxyl-terminated olefins, reference may be made to U.S. Pat. No. 4,975,488, the entire contents of which are incorporated by reference herein.

Isocyanate-terminated and amine-terminated polyurethane-polyurea (poly(urethane-urea) or polyurethaneurea) prepolymers contain one or more urethane linkages and one or more urea linkages in their polymer chains whereas isocyanate-terminated and amine-terminated polyureas contain predominantly, if not exclusively, urea linkages in their polymer chains. Both types of prepolymers are known in the art. Silylation of these prepolymers can be carried out with a mixture of isocyanate-reactive silanes and silylation of the amino-terminated prepolymers can be carried out with a mixture of isocyanatosilanes much as described above in connection with the silylation of hydroxyl-terminated and isocyanate-terminated precursor polymers.

Moisture-curable silylated polymer of the invention can be obtained by hydrosilylating a polymer possessing terminal olefinic unsaturation with a mixture of hydridosilane (hydrosilane). The mixture of hydridosilanes comprises silanes (i), (ii) and, optionally, (iii) and/or (iv), wherein X is hydrogen (—H) and $R^1$ is a chemical bond between the hydrogen and silicon atom. The experimental conditions for hydrosilation of the olefinically unsaturated polyethers are disclosed, inter alia, in aforementioned U.S. Pat. No. 4,975,488 and in U.S. Pat. Nos. 4,371,664; 4,334,036; 5,298,572; 5,986,014; 6,274,688; 6,420,492; 6,552,118; 7,153,911; 7,202,310; and 7,223,817, the entire contents of which are incorporated by reference herein.

The moisture-curable composition of the present invention can be combined with one or more optional components, e.g., polymer other than a moisture-curable silylated polymer of the invention, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant in known and conventional amounts, etc., with the silylated polymer(s) of the present invention being present in the mixture at a level of from 10 to 80, and preferably from 20 to 50, weight parts per 100 weight parts thereof.

Examples of the optional polymers that are suitable for addition to compositions containing the moisture-curable silylated polymer of this invention include linear low density polyethylene (LLDPE), high density polyethylene (HDPE), polypropylene, polybutylene, polyester, polyamide, and the like, used in known and conventional amounts.

Useful tackifiers and/or gums that can be incorporated in the compositions of this invention, especially when such compositions are formulated as adhesives, include MQ tackifier resin, terpene oligomer, coumarone/indene resin, aliphatic, petrochemical resin and modified phenolic resin, e.g., as disclosed in U.S. Pat. No. 7,405,259, the entire contents of which are incorporated by reference herein, flouroalkylsilylated MQ resin, e.g., as disclosed in U.S. Pat. No. 7,253,238, the entire contents of which are incorporated by reference herein, silicone gum, e.g., flourosilicon gum, such tackifiers/gums being utilized in known and conventional amounts.

Examples of plasticizers that are suitable for optional addition to the moisture-curable composition herein include phthalates, dipropylene and diethylene glycol dibenzoates and mixtures thereof, epoxidized soybean oil, and the like. Dioctyl and diisodecylphthalate are commercially available under the trade names Jayflex DOP and JayFlex DIDP from Exxon Chemical. The dibenzoates are available as Benzoflex 9-88, Benzoflex 9-88SG, Benzoflex 50 and Benzoflex 400 from Velsicol Chemical Corporation. Epoxidized soybean oil is available as Flexol EPO from Houghton Chemical Corporation. Plasticizer can be present in the composition comprising the silylated polymer of the present invention herein at a level of from 0 to 40, and preferably from 5 to 20, weight parts per 100 weight parts of the total composition.

Solvent can be used to modify the viscosity and aid in wetting of the composition comprising the silylated polymer of the present invention. Useful solvents include aromatic and aliphatic esters and ketones ranging in amounts of from 0 to 20, and preferably from 0 to 5, weight parts per 100 weight parts of the total composition.

Illustrative of useful thixotropic agents are various castor waxes, fumed silica, treated clays and polyamides. These optional additives typically comprise from 0 to 10, and preferably from 0.1 to 2, weight parts per 100 weight parts of the total composition herein. The thixotropes include those available as Aerosil from Degussa; Cabo-Sil TS 720 from Cabot; Castorwax from CasChem; Thixatrol and Thixcin from Rheox; Crayvallac from Crayvalley Corporation; and Dislon from King Industries. If the thixotrope is reactive with silane, e.g., silica, adjustments to the amount formulated may be needed to compensate therefor.

Fillers can be particulates, fibers, pellets, aggregates, agglomerates and granulates. Typical particulate materials, e.g., fillers, that are suitable for optional addition to the moisture-curable composition comprising the silylated polymer of the present invention herein include clays, alumina-silicates, talc, wollastonite, mica, fumed silica, precipitated silica and calcium carbonates. Treated calcium carbonates having particle sizes from 0.07μ to 4μ are particularly useful and are available under several trade names Ultra Pflex, Super Pflex, Hi Pflex from Specialty Minerals; Winnofil SPM, SPT from Solvay; Hubercarb lat, Hubercarb 3Qt and Hubercarb W from Huber; Kotomite from ECC; and Omyacarb FT and BLP-3 from Omya. Particulate materials such as any of the foregoing can be present in composition comprising the silylated polymer of the present invention at a level of from 0 to 70, and preferably from 35 to 60, weight parts per 100 weight parts of the total composition.

Suitable moisture scavengers and adhesion promoters can be selected from among any of the known and conventional silanes heretofore used in any of these roles. Preferred moisture scavenging silanes are vinyltrimethoxysilane and methyltrimethoxysilane. Useful adhesion-promoting silanes include gamma-glycidoxypropyltrimethoxysilane, gamma-aminopropyltrimethoxysilane, N-beta-(aminoethyl)-gamma-aminopropyltrimethoxysilane, bis-(gamma-trimethoxysilylpropyl)amine, N-beta-(aminoethyl)-gamma-aminopropylmethyldimethoxysilane and tris-(gamma-trimethoxylsilyl)isocyanurate.

In the manufacture of moisture-curable silylated polymer as described above, small amounts of residual isocyanate groups, and possibly hydroxyl groups, which might accompany the silylated polyurethane polymer may undergo reaction during the storage of the composition herein. Depending on the extent of their reaction(s) which, for example, might include the further reaction of isocyanate with hydroxyl-terminated prepolymer, if following silylation, there is still hydroxyl present, reaction of isocyanate with the hydrogen of a urethane group to form allophanate, and reaction of isocyanate with the hydrogen atom of a urea group to form biuret, could result in an increase in viscosity of the silylated polyurethane polymer to a level which makes application of the composition quite difficult, and in the case of its manual application from a hand-operated cartridge, impractical if not impossible for individuals of average strength. To avoid or mitigate this problem, it can be advantageous to include in the formulation an isocyanate-reactive scavenging agent as disclosed in commonly assigned copending U.S. patent application Ser. No. 11/524,844, filed Sep. 21, 2006, published as U.S. 2008/0076899 on Mar. 27, 2008, the entire contents of which are incorporated by reference herein. As disclosed in this application, the isocyanate-reactive scavenging agent possesses at least one active hydrogen and will react with isocyanate at a rate greater than any of the undesired reactions that could cause a significant increase in the viscosity of the composition herein. Suitable isocyanate-scavenging agents include methanol, ethanol, n-propanol, isopropanol, n-butanol, sec-butanol, tert-butanol, and mixtures thereof. These and similar isocyanate-scavenging agents can be incorporated in the compositions comprising the silylated polyurethane polymer at a level of from 0.01 to 0.5, and preferably from 0.02 to 0.2, weight parts per 100 parts by weight of the total composition.

Known and conventional U.V. stabilizers and/or antioxidants can be incorporated in the composition herein at the usual levels, e.g., from 0 to 10, and preferably from 0 to 4, weight parts per 100 weight parts of the total composition. Suitable materials of this type are available from Ciba-Geigy under the trade names Tinuvin 770, Tinuvin 765, Tinuvin 327, Tinuvin 213, Tinuvin 622 and Irganox 1135.

Catalyst can be selected from any of those compounds known to be useful for accelerating crosslinking in moisture-curable adhesive, sealant and coating compositions. The catalyst can be a metal or non-metal compounds. Examples of metal condensation cure catalysts useful in the present invention include tin, titanium, zirconium, lead, iron, cobalt, antimony, manganese, bismuth and zinc compounds. The tin compounds useful for facilitating crosslinking of the silylated polymers of the present invention, include non-chelated tin compounds such as dibutyltin dilaurate, dibutyltin diacetate, dibutyltin dimethoxide, dimethyltin di-neodecanoate, tin octoate and dibutyltinoxide. Diorgano-tin bis β-diketonates can be used. A preferred diorganotin bis β-diketonate is dibutyltin bis-acetylacetonate. Other examples of useful tin compounds can be found in U.S. Pat. Nos. 5,213,899, 4,554,338, 4,956,436, and 5,489,479, the entire contents of which are incorporated by reference herein. Chelated titanium compounds, for example, 1,3-propanedioxytitanium bis(ethylacetoacetate), di-isopropoxytitanium bis(ethylacetoacetate), and tetra-alkyl titanates, for example tetra n-butyltitanate and tetra-isopropyltitanate, are also useful. It is preferred that the condensation catalyst of the present invention be a metal catalyst. The preferred metal condensation catalyst is advantageously selected from the group consisting of tin compounds with dibutyltin dilaurate and "chelated" dibutyltin oxide, especially Fomrez™ SUL-11A from Momentive Performance Materials, being most preferred.

Other optional components include other resins, e.g., curable resins such as epoxy resins, acrylates and methacrylate resins, polyurethanes, silanol-terminated polydiorganosiloxanes, etc., cure catalysts for such resins, defoamers, viscosity controllers, fragrances, pigments, colorants, biocides, biostats, etc., in known and conventional amounts.

The moisture-curable composition comprising one or more silylated polymers of this invention can be formulated for use as adhesives, sealants, coatings, gaskets, industrial rubber products, and the like. For formulation as sealant compositions, the moisture-curable silylated polymer of the present invention are combined with fillers and other additives known in the prior art for use in elastomeric compositions. By the addition of such materials, particular physical properties such as viscosity, flow rate, sag, and the like, can be achieved.

The moisture-curable composition can be prepared, e.g., by thoroughly mixing together the selected moisture-curable silylated polymer(s) of the present invention, optional component(s) such as plasticizer, particulate material, etc., and/or catalyst in either a batch or continuous mode of manufacture.

In a batch process, the components of the composition can be substantially uniformly combined using a double planetary mixer with high-speed disperser, a twin-screw extruder, and/or a Hauschild SpeedMixer™. Typically, the moisture-curable silylated polymer and optional component(s) are substantially uniformly mixed at between 60° C. and 90° C. for 1 to 3 hours. After cooling to below 50° C., silane adhesion promoter, and cure catalyst may be added and the composition mixed for an additional 10 minutes to 60 minutes under a dry nitrogen atmosphere. The composition is then vacuum de-gassed for approximately 5 minutes to 60 minutes and thereafter packaged to complete.

In a continuous manufacturing process, all of the components of the moisture-curable composition can be mixed in a continuous compounding extruder such as the twin screw Werner-Pfleiderer/Coperion extruder, a Buss extruder or a P.B. Kokneader extruder. In such a process, the extruder is typically operated at a temperature of from 50° to 100° C., and more preferably from 60° to 80° C., preferably under a vacuum so as to remove volatiles that may be produced during the mixing operation.

EXAMPLE 1

This example illustrates the preparation of silylating reactant containing a mixture of isocyanatosilanes (i)-(iv).

Into a flask equipped with a stirrer were added 3-isocyanatopropyltrimethoxysilane (10.25 grams, 0.05 mole), 3-isocyanatopropyltriethoxysilane (24.7 grams, 0.1 mole) and dodecyl benzene sulfonic acid (0.05 gram). The mixture was stirred until homogeneous. GC analysis indicated that the composition was made up of 38.17 mole percent 3-isocyanatopropyltrimethoxysilane, 52.09 mole percent 3-isocyanatopropyltriethoxysilane, 4.76 mole percent 3-isocyanatopropyldimethoxyethoxysilane and 4.98 mole percent 3-isocyanatopropylmethoxydiethoxysilane and.

EXAMPLE 2

This example illustrates the preparation of silylating reactant containing a mixture of isocyanatosilanes (i)-(iv).

Into a flask equipped with a stirrer were added 3-isocyanatopropyltrimethoxysilane (15.38 grams, 0.075 mole), 3-isocyanatopropyltriethoxysilane (18.53 grams, 0.075 mole) and dodecylbenzene sulfonic acid (0.05 gram). The mixture was stirred until homogeneous. GC analysis indicated that the composition was 49.38 mole percent 3-isocyanatopropyltrimethoxysilane, 45.43 mole percent 3-isocyanatopropyltriethoxysilane, 1.33 mole percent 3-isocyanatopropyldimethoxyethoxysilane and 2.03 mole percent 3-isocyanatopropylmethoxydiethoxysilane.

EXAMPLE 3

This example illustrates the preparation of silylating reactant containing a mixture of isocyanatosilanes (i)-(iv).

Into a flask equipped with a stirrer were added 3-isocyanatopropyltrimethoxysilane (20.5 grams, 0.1 mole), 3-isocyanatopropyltriethoxysilane (12.35 grams, 0.05 mole) and dodecylbenzene sulfonic acid (0.05 gram). The mixture was stirred until homogeneous. GC analysis indicated that the composition was 60.95 mole percent 3-isocyanatopropyltrimethoxysilane, 38.26 mole percent 3-isocyanatopropyltriethoxysilane 2.65 mole percent 3-isocyanatopropyldimethoxyethoxysilane and 1.85 mole percent 3-isocyanatopropylmethoxydiethoxysilane.

EXAMPLE 4

This example illustrates the preparation of silylating reactant containing a mixture of aminosilanes (i)-(iv).

Into a flask equipped with a stirrer were added 3-aminopropyltrimethoxysilane (8.95 grams, 0.05 mole), 3-aminopropyltriethoxysilane (22.1 grams, 0.1 mole) and isopropyl alcohol (0.05 gram). The mixture was stirred until homogeneous. GC analysis indicated that the composition was 15.48 mole percent 3-aminopropyltrimethoxysilane, 38.78 mole percent 3-aminopropyltriethoxysilane, 16.99 mole percent 3-aminopropyldimethoxyethoxysilane and 28.75 mole percent 3-aminopropylmethoxydiethoxysilane.

EXAMPLE 5

This example illustrates the preparation of silylating reactant containing a mixture of aminosilanes (i)-(iv).

Into a flask equipped with a stirrer were added 3-aminopropyltrimethoxysilane (13.43 grams, 0.075 mole), 3-aminopropyltriethoxysilane (16.58 grams, 0.075 mole) and isopropyl alcohol (0.05 gram). The mixture was stirred until homogeneous. GC analysis indicated that the composition was 29.98 mole percent 3-aminopropyltrimethoxysilane, 34.29 mole percent 3-aminopropyltriethoxysilane, 17.01 mole percent 3-aminopropyldimethoxyethoxysilane and 18.72 mole percent 3-aminopropylmethoxydiethoxysilane.

EXAMPLE 6

This example illustrates the preparation of silylating reactant containing a mixture of aminosilanes (i)-(iv).

Into a flask equipped with a stirrer were added 3-aminopropyltrimethoxysilane (17.9 grams, 0.1 mole), 3-aminopropyltriethoxysilane (11.05 grams, 0.05 mole) and isopropyl alcohol (0.05 gram). The mixture was stirred until homogeneous. GC analysis indicated that the composition was 35.86 mole percent 3-aminopropyltrimethoxysilane, 23.76 mole percent 3-aminopropyltriethoxysilane, 20.69 mole percent 3-aminopropyldimethoxyethoxysilane and 19.69 mole percent 3-aminopropylmethoxydiethoxysilane.

EXAMPLE 7

This example illustrates the preparation of moisture-curable silylated polyurethane polymer.

A. Preparation of Hydroxyl-Terminated Polyurethane Prepolymer

Acclaim 12200 poly(oxypropylene)ether diol (440 grams, 0.033 mole, weight average molecular weight of 12000, from Bayer) was charged into a four-neck reaction kettle. The diol was agitated and sparged by nitrogen at 80° C. over night. The temperature of the diol was then cooled to 45±5° C. Isophorone diisocyanate (3.70 grams, 0.017 mole from Bayer) was added and mixed for 5 minutes. Fomrez SUL-4 (7.5 ppm tin, dibutyltin dilaurate provided by Momentive Performance Materials) was added. After reaching isothermal, the reactants were heated to 75° C. and maintained at 75±2° C. with stirring and under a nitrogen blanket. The NCO content was determined by the n-dibutylamine titration method and monitored approximately every 30 minutes. When the NCO content of the reaction mixture reached nearly zero, the prepolymer-forming reaction was considered to be complete.

B. Silylation of the Hydroxyl-Terminated Polyurethane Prepolymer

To the hydroxyl-terminated polyurethane prepolymer obtained in Step A, a mixture of 3-isocyanatopropyltrimethoxysilane (4.96 grams, 0.022 mol, available from Momentive Performance Materials under the tradename Silquest* A-Link 35 silane) and 3-isocyanatopropyltriethoxysilane (2.90 grams, 0.011 mole, available from Momentive Performance Materials under the tradename Silquest* A-Link 25 silane) was added and the silylation reaction allowed to proceed at the aforesaid temperature of 75±2° C. until completion as determined by titration. Viscosity of the product moisture-curable silylated polyurethane prepolymer was approximately 48,000 cP at room temperature. The silylated polymer was mixed with 1% tin Fomrez SUL-11A from Momentive Performance Materials, cured in the presence of atmospheric moisture and the mechanical properties of the cured resin measured.

EXAMPLE 8

This example illustrates the preparation of silylated polyurethane prepolymer as in Example 7, supra.

Hydroxyl-terminated polyurethane prepolymer was prepared as described in Step A of Example 7. When the reaction had reached the capping point, i.e., when the NCO content had reduced to near zero as measured by titration, the silylating reactant, a mixture 3-isocyanatopropyltrimethoxysilane (3.62 grams, 0.017 mole) and 3-isocyanatopropyltriethoxysilane (4.36 grams 0.017 mole) was added, and the reaction allowed to proceed at the same temperature of 75±0.2° C. until completion as determined by titration. The viscosity of the moisture-curable silylated polyurethane prepolymer was approximately 60,100 cP at ambient temperature. The silylated polymer was mixed with 1% tin Fomrez SUL-11A from Momentive Performance Materials, cured in the presence of atmospheric moisture and the mechanical properties of the cured resin measured.

EXAMPLE 9

This example illustrates the preparation of silylated polyurethane prepolymer as in Example 7, supra.

Hydroxyl-terminated polyurethane prepolymer was prepared as in Step A of Example 7. When the reaction had reached the capping point, the silylating reactant, a mixture 3-isocyanatopropyltrimethoxysilane (2.48 grams, 0.011 mole) and 3-isocyanatopropyltriethoxysilane (5.72 grams 0.022 mole), was added and the reaction allowed to proceed at the same temperature of 75±0.2° C. until completion as determined by titration. The viscosity of the silylated polyurethane prepolymer was approximately 78,7000 cP at ambient temperature. The silylated polymer was mixed with 1% tin Fomrez SUL-11A from Momentive Performance Materials, cured in the presence of atmospheric moisture and the mechanical properties of the cured resin measured.

COMPARATIVE EXAMPLE 1

This example illustrates the preparation of silylated polyurethane prepolymer employing a trimethoxysilane as the sole silylating reactant.

Hydroxyl-terminated polyurethane prepolymer was prepared as described in Step A of Example 7. When the reaction had reached the capping point, the silylating reactant 3-isocyanatopropyltrimethoxysilane (7.58 grams, 0.034 mole) was added and the reaction allowed to proceed at the same temperature of 75±0.2° C. until completion as determined by titration. The viscosity of the silylated polyurethane prepolymer was approximately 71,3000 cP at ambient temperature. The silylated polymer was mixed with 1% tin Fomrez SUL-11A from Momentive Performance Materials, cured in the presence of atmospheric moisture and the mechanical properties of the cured resin measured.

COMPARATIVE EXAMPLE 2

This example illustrates the preparation of silylated polyurethane prepolymer employing a triethoxysilane silane as the sole silylating reactant.

Hydroxyl-terminated polyurethane prepolymer was prepared as in Step A of Example 7. When the reaction had reached the capping point, the silylating reactant 3-isocyanatopropyltriethoxysilane (8.84 grams, 0.034 mole) was added and the reaction allowed to proceed at the same temperature 75±0.2° C. until completion as determined by titration. The viscosity of the silylated polyurethane prepolymer was approximately 64,700 cP at ambient temperature. The silylated polymer was mixed with 1% tin Fomrez SUL-11A from Momentive Performance Materials, cured in the presence of atmospheric moisture and the mechanical properties of the cured resin measured.

After the full cure of the silylated polymers of Examples 7-9 and Comparative Examples 1 and 2, the mechanical properties of the cured polymers were determined using an Instron Tensile Tester according to ASTM D412, and hardness Shore A was tested according to ASTM C661. The results of these tests are presented in Table 1 below.

TABLE 1

Mechanical Properties of Cured Silylated Polyurethane Prepolymers

| | Tensile Strength at Break psi (MPa) | Young's Modulus psi (MPa) | Modulus at 100% extension psi (MPa) | Elongation at Break (%) | Hardness Shore A |
|---|---|---|---|---|---|
| Example 7 | 67 (0.467) | 108 (0.744) | 38 (0.262) | 254 | 18 |
| Example 8 | 87 (0.599) | 69 (0.475) | 59 (0.406) | 200 | 23 |
| Example 9 | 78 (0.537) | 73 (0.503) | 54 (0.372) | 185 | 19 |
| Comparative Example 1 | 75 (0.517) | 56 (0.386) | 46 (0.317) | 230 | 20 |
| Comparative Example 2 | 66 (0.455) | 83 (0.572) | 35 (0.241) | 286 | 16 |

As the data in Table 1 show, the mechanical properties of the moisture-cured polymers of Examples 7-9 and Comparative Example 1 and 2 were essentially the same.

The storage-life of the silylated polyurethane polymers of Examples 7-9 and Comparative Examples 1 and 2 was evaluated. Each silylated polyurethane polymer was maintained in an open dish at about 22° C. and 50% relative humidity. The viscosities of the exposed silylated polyurethane polymers were measured frequently over a 10-day period. The test results are set forth in Table 2 below.

TABLE 2

Change in Viscosity of Silylated Polyurethane Polymers with Time

| | Viscosity, cP at 22° C. | | | | |
|---|---|---|---|---|---|
| Time, days | Example 7 | Example 8 | Example 9 | Comparative Example 1 | Comparative Example 2 |
| 0 | 48,000 | 78,000 | 65,700 | 71,000 | 65,700 |
| 3 | 71,000 | 83,100 | 63,000 | 207,000 | 82,700 |
| 4 | 71,300 | 87,000 | 71,200 | 205,000 | 80,700 |
| 5 | | | | 205,000 | |
| 6 | 73,000 | | | 205,000 | 83,400 |
| 7 | | 92,000 | 74,300 | | |
| 9 | 80,000 | 93,700 | 79,800 | 205,000 | 84,500 |
| 10 | 81,500 | 94,100 | 85,100 | 205,3 | 84,700 |

The data in Table 2 demonstrate marked improvement in the stability of the polymers of Examples 7-9 prepared in accordance with the invention, i.e., employing as silylating reactant a mixture of silanes (i) and (ii), compared to the polymer of Comparative Example 1 which was obtained with a single silylating reactant containing three methoxy groups, i.e., silane (i).

The curing time for Examples 7-9 and Comparative Examples 1 and 2 were determined according to their surface tack-free time employing ASTM C679-03 as the test method. 3-Aminopropyltrimethoxysilane is often used as an adhesion promoter in adhesive and sealant compositions. Its other function in such formulations is as a co-catalyst for the hydrolysis of silane endcappers. Three different tin catalysts and an acid catalyst were used in conjunction with 3-aminopropyltrimethoxysilane, respectively, in this evaluation. For a comparison, Fomrez SUL-11A from Momentive Performance Materials was used without the co-catalyst.

The different catalyst packages were added to the silylated polyurethane polymers of Examples 7-9 and Comparative Examples 1 and 2 in the weight amounts indicated in Table 3 below. The mixtures were thoroughly blended well on a high speed mixer and then placed in open dishes and exposed to air at ambient temperature. The surface tackiness of each mixture was tested frequently by touching the polymer surface with a gloved finger. Tack-free time (measured in minutes) was reached when the resin no longer adhered to the glove. The test results are set forth in Table 3.

TABLE 3

Tack-free Times for Silylated Polyurethane Polymer Containing Different Cure Catalyst Packages

| Tack-free Time (min) | Cure Catalyst Package | | | |
|---|---|---|---|---|
| | 1% SUL 4[2] 1% silane[1] | 1% SUL-11A[3] and 1% silane[1] | 1% U-220H[4] 1% silane[1] | 1% SUL-11A[3] |
| Example 7 | 25 | 15 | 10 | 25 |
| Example 8 | 50 | 20 | NA | 35 |
| Example 9 | 50 | 20 | 10 | 45 |
| Comparative Example 1 | 20 | 10 | 10 | 15 |
| Comparative Example 2 | >120 | 90 | NA | 80 |

[1]The silane is 3-aminopropyltrimethoxysilane, available from Momentive Performance Materials under the tradename Silquest* A-1110 silane.
[2]Fomrez SUL 4 is dibutyltin dilaurate from Momentive Performance Materials.
[3]Fomrez SUL-11A is a 1:1 blend of ditutyltin dioxide/DIPO plasticizer from Momentive Performance Materials.
[4]Neostann U-220H is dibutylbis(pentane-2-4-dionato-O.O')tin from Nippon Chem.

The data in Table 3 shows that the curing rates of the polymers of Examples 7-9 are nearly as fast as that of the polymers of Comparative Example 1 and considerably faster than that of the polymer of Comparative Example 2.

By way of summarizing the foregoing data, the moisture-curable polymers of Examples 7-9 displayed improved storage stability while exhibiting curing rates similar to those obtained with polyurethane prepolymer silylated exclusively with trimethoxysilane. The data further show that the mechanical properties of the cured polymers of Examples 7-9 were similar to those of the cured polymers of Comparative Examples 1 and 2.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

What is claimed is:

1. A moisture-curable silylated polymer obtained by reacting a prepolymer with a silylating reactant comprising silane (i) possessing three methoxy groups, silane (ii) possessing three alkoxy groups independently containing from 2 to 4 carbon atoms, and, silane (iii) possessing two methoxy groups and one alkoxy group of from 2 to 4 carbon atoms and/or silane (iv) possessing one methoxy group and two alkoxy groups independently containing from 2 to 4 carbon atoms, wherein the silylating reactant comprises from 15 to 85 mole percent silane (i), from 15 to 85 mole percent silane (ii), from 1 to 45 mole percent silane (iii) and from 0 to 45 mole percent (iv).

2. The moisture-curable silylated polymer of claim 1 wherein the prepolymer possesses hydroxyl functionality and the silylating reactant possesses isocyanate functionality, or the prepolymer possesses isocyanate functionality and the silylating reactant possesses amine functionality.

3. The moisture-curable silylated polymer of claim 1 wherein the prepolymer is a hydroxyl-terminated polyurethane prepolymer derived from a polyether diol and a diisocyanate and the silylating reactant is a mixture of isocyanatosilanes (i) and (ii) and, optionally, isocyanatosilane (iii) and/or isocyanatosilane (iv), or the prepolymer is an isocyanate-terminated polyurethane prepolymer derived from a polyether diol and a diisocyanate and the silylating reactant is a mixture of aminosilanes (i) and (ii) and, optionally, aminosilane (iii) and/or aminosilane (iv).

4. The moisture-curable silylated polymer of claim 3 wherein the polyether dial is produced by a polymerization process employing a double-metal cyanide catalyst and the diisocyanate is isophorone diisocyanate.

5. The moisture-curable silylated polymer composition of claim 1 wherein the silylating reactant comprises from 15 to 85 mole percent silane (i), from 15 to 85 mole percent silane (ii), from 1 to 45 mole percent silane (iii) and from 1 to 45 mole percent (iv).

6. The moisture-curable silylated polymer composition of claim 4 wherein the silylating reactant comprises from 15 to 85 mole percent silane (i), from 15 to 85 mole percent silane (ii), from 1 to 45 mole percent silane (iii) and from 1 to 45 mole percent (iv).

7. The moisture-curable silylated polymer of claim 1 wherein silanes (i), (ii), (iii) and (iv) are of the general formulae:

$$XR^1Si(OCH_3)_3 \qquad (i)$$

$$XR^1Si(OR^2)_3 \qquad (ii)$$

$$XR^1Si(OCH_3)_2(OR^2) \qquad (iii)$$

$$XR^1Si(OCH_3)(OR^2)_2 \qquad (iv)$$

wherein:
each occurrence of X is independently a reactive functional group selected from the group comprising —SH, —NHR$^3$, —NHCH(CO$_2$R$^4$)CH$_2$CO$_2$R$^4$, —NHC(=O)NH$_2$, —NCO and —H, with the proviso that when X is —H, R$^1$ is a chemical bond;

each occurrence of R$^1$ is independently a chemical bond or a divalent hydrocarbon group of from 1 to 18 carbon atoms, and optionally containing one or more heteroatoms selected from the group consisting of oxygen, nitrogen and sulfur, with the proviso that when R$^1$ is a chemical bond, X is —H;

each occurrence of R$^2$ is a monovalent alkyl group independently containing from 2 to 4 carbon atoms;

each occurrence of R$^3$ is independently hydrogen, a monovalent hydrocarbon group of from 1 to 8 carbon atoms or —R$^5$Si(OCH$_3$)$_x$(OR$^6$)$_{3-x}$;

each occurrence of R$^4$ is independently hydrogen or a monovalent hydrocarbon group of from 1 to 8 carbon atoms;

each occurrence of R$^5$ is independently a divalent hydrocarbon group of from 1 to 18 carbon atoms, and optionally containing one or more heteroatoms selected from the group consisting of oxygen, nitrogen and sulfur;

each occurrence of R$^6$ is a monovalent alkyl group independently containing from 2 to 4 carbon atoms; and, each occurrence of x is independently an integer of from 0 to 3.

8. The moisture-curable silylated polymer composition of claim 7 wherein:
silane (i) is selected from the group consisting of
2-mercaptoethyltrimethoxysilane,
3-mercaptopropyltrimethoxysilane,
4-mercaptobutyltrimethoxysilane,
3-mercaptobutyltrimethoxysilane,
3-mercapto-2-methylpropyltrimethoxysilane,
3-mereaptocyclohexyltrimethoxysilane,
12-mercaptododecyltrimethoxysilane,
18-mercaptooctadecyltrimethoxysilane,
2-mercaptophenyltrimethoxysilane,
2-mercaptotolyltrimethoxysilane,
1-mercaptomethyltolyltrimethoxysilane,
2-mercaptoethylphenyltrimethoxysilane,
2-mercaptoethyltolyltrimethoxysilane,
3-mercaptopropylphenyltrimethoxysilane,
3-aminopropyltrimethoxysilane,
N-methyl-3-amino-2-methylpropyltrimethoxysilane,
N-ethyl-3-amino-2-methylpropyltrimethoxysilane,
N-butyl-3-aminopropyltrimethoxysilane,
3-(N-methyl-2-amino-1-methyl-1-ethoxy)-propyltrimethoxysilane,
N-ethyl-4-amino-3,3-dimethylbutyltrimethoxysilane,
N-(cyclohexyl)-3-aminopropyltrimethoxysilane,
bis-(3-trimethoxysilpropyl)amine,
bis-(3-trimethoxysilyl-2-methylpropyl)amine,
N-(3-trimethoxysilylpropyl)-3-amino-2-methylpropyltrimethoxysilane,
2-(trimethoxysilanylmethyl-amino)-succinic acid dimethyl ester,
2-(trimethoxysilanylmethyl-amino)-succinic acid diethyl ester,
2-(trimethoxysilanylmethyl-amino)-succinic acid dibutyl ester,
2-(trimethoxysilanyl-ethylamino)-succinic acid dimethyl ester,
2-(trimethoxysilanyl-propylamino)-succinic acid dimethyl ester,
2-(trimethoxysilanyl-propylamino)-succinic acid diethyl ester,
2-(trimethoxysilanyl-propylamino)-succinic acid dibutyl ester,
ureidomethyltrimethoxysilane,
2-ureidoethyltrimethoxysilane,
3-ureidopropyltrimethoxysilane,
6-ureidohexyltrimethoxysilane,
isocyanatomethyltrimethoxysilane,
2-isocyanatoethyltrimethoxysilane and 3-isocyanatopropyltrimethoxysilane;
siline (ii) is selected from the group consisting of
2-mercaptoethyltriethoxysilane,
3-mercaptopropyltriethoxysilane,
4-mercaptobutyltriethoxysilane,
3-mercaptobutyltriethoxysilane,
3-mercapto-2-methylpropyltriethoxysilane,
3-mercaptocyclohexyltriethoxysilane,
12-mercaptododecyltriethoxysilane,
18-mercaptooctadecyltripropoxysilane,
2-mercaptophenyltributoxysilane,
2-mercaptotolyltriethoxysilane,
1-mercaptomethyltolyltriethoxysilane,
2-mercaptoethylphenyltriethoxysilane,
2-mercaptoethyltolyltriethoxysilane,
3-mercaptopropylphenyltri-iso-propoxysilane,
3-aminopropyltriethoxysilane,
N-methyl-3-amino-2-methylpropyltriethoxysilane,
N-ethyl-3-amino-2-methylpropyltriethoxysilane,
N-butyl-3-aminopropyltriethoxysilane,
3-(N-methyl-2-amino-1-methyl-1-ethoxy)-propyltripropoxysilane,
N-ethyl-4-amino-3,3-dimethylbutyltriethoxysilane,
N-(cyclohexyl)-3-aminopropyltriethoxysilane,
bis-(3-triethoxysilpropyl)amine,
bis-(3-triethoxysilyl-2-methylpropyl)amine,
N-(3-triethoxysilylpropyl)-3-amino-2-methylpropyltriethoxysilane,
2-(triethoxysilanylmethyl-amino)-succinic acid dimethyl ester,
2-(triethoxysilanylmethyl-amino)-succinic acid diethyl ester,
2-(triethoxysilanylmethyl-amino)-succinic acid dibutyl ester,
2-(triethoxysilanyl-ethylamino)-succinic acid dimethyl ester,
2-(triethoxysilanyl-propylamino)-succinic acid dimethyl ester,
2-(triethoxysilanyl-propylamino)-succinic acid diethyl ester,
2-(triethoxysilanyl-propylamino)-succinic acid dibutyl ester, ureidomethyltriethoxysilane,
2-ureidoethyltriethoxysilane,
3-ureidopropyltriethoxysilane,
6-ureidohexyltriethoxysilane,
isocyanatomethyltriethoxysilane,
2-isocyanatoethyltriethoxysilane,
3-isocyanatopropyltriethoxysilane,
3-isocyanatopropyltri-n-propoxysilane,
3-isocyanatopropyltri-n-butoxysilane,
3-isocyanatopropyltriisopropoxysilane,
3-isocyanatopropyltri-sec-butoxysilane and
3-isocyanatopropyltriisopropoxysilane;
silane (iii) is selected from the group consisting of
2-mercaptoethyldimethoxyethoxysilane,
3-mercaptopropyldimethoxyethoxysilane,
4-mercaptobutyldimethoxyethoxysilane,
3-mercaptobutyldimethoxyethoxysilane,
3-mercapto-2-methylpropyldimethoxyethoxysilane,
3-mercaptocyclohexyldimethoxyethoxysilane,
12-mercaptododecyldimethoxyethoxysilane,
18-mercaptooctadecyldimethoxyethoxysilane,
2-mercaptophenyldiniethoxyethoxysilane,
2-mercaptotolyldimethoxyethoxysilane,
1-mercaptomethyltolyldimethoxyethoxysilane,
2-mercaptoethylphenyldimethoxyethoxysilane,
2-mercaptoethyltolyldimethoxyethoxysilane,
3-mercaptopropylphenyldimethoxyethoxysilane,
3-aminopropyldimethoxyethoxysilane,
N-methyl-3-amino-2-methylpropyldimethoxyethoxysilane,
N-ethyl-3-amino-2-methylpropyldimethoxyethoxysilane,
N-butyl-3-aminopropyldimethoxyethoxysilane,
3-(N-methyl-2-amino-1-methyl-1-ethoxy)-propyldimethoxyethoxysilane,
N-ethyl-4-amino-3,3-dimethylbutyldimethoxyethoxysilane,
N-(cyclohexyl)-3-aminopropyldimethoxyethoxysilane,
bis-(3-dimethoxyethoxysilpropyl)amine,
bis-(3-dimethoxyethoxysilyl-2-methylpropyl)amine and
N-(3-dimethoxyethoxysilylpropyl)-3-amino-2-methylpropyldimethoxyethoxysilane, 2-(dimethoxyethoxysilanylmethyl-amino)-succinic acid dimethyl ester,
2-(dimethoxyethoxysilanylmethyl-amino)-succinic acid diethyl ester,
2-(dimethoxyethoxysilanylmethyl-amino)-succinic acid dibutyl ester,
2-(dimethoxyethoxysilanyl-ethylamino)-succinic acid dimethyl ester,
2-(dimethoxyethoxysilanyl-propylamino)-succinic acid dimethyl ester,
2-(dimethoxyethoxysilanyl-propylamino)-succinic acid diethyl ester,
2-(dimethoxyethoxysilanyl-propylamino)-succinic acid dibutyl ester,
ureidomethyldiniethoxyethoxysilane,
2-ureidoethyldimethoxyethoxysilane,
3-ureidopropyldimethoxyethoxysilane,
6-ureidohexyldimethoxyethoxysilane,
isocyanatomethyldimethoxyethoxysilane,
2-isocyanatoethyldimethoxyethoxysilane,
3-isocyanatopropyldimethoxyethoxysilane,
3-isocyanatopropyldimethoxy-n-propoxysilane,
3-isocyanatopropyldimethoxy-n-butoxysilane,
3-isocyanatopropyldimethoxyisopropoxysilane,
3-isocyanatopropyldimethoxy-sec-butoxysilane and
3-isocyanatopropyldimethoxyisobutoxysilane; and,
silane (iv) is selected from the group consisting of
2-mercaptoethylmethoxydiethoxysilane,
3-mercaptopropylmethoxydiethoxysilane,
4-mercaptobutylmethoxydiethoxysilane,
3-mercaptobutylmethoxydiethoxysilane,
3-mercapto-2-methylpropylmethoxydiethoxysilane,
3-mercaptocyclohexylmethoxydiethoxysilane,
12-mercaptododecylmethoxydiethoxysilane,
18-mercaptooctadecylmethoxydiethoxysilane,
2-mercaptophenylmethoxydiethoxysilane,
2-mercaptotolylmethoxydiethoxysilane,
1-mercaptomethyltolylmethoxydiethoxysilane,
2-mercaptoethylphenylmethoxydiethoxysilane,
2-mercaptoethyltolylmethoxydiethoxysilane,
3-mercaptopropylphenylmethoxydiethoxysilane,
3-aminopropylmethoxydiethoxysilane,
N-methyl-3-amino-2-methylpropylmethoxydiethoxysilane,
N-ethyl-3-amino-2-methylpropylmethoxydiethoxysilane,
N-butyl-3-aminopropylmethoxydiethoxysilane,
3-(N-methyl-2-amino-1-methyl-1-ethoxy)-propyl-methoxydiethoxysilane,
N-ethyl-4-amino-3,3-dimethylbutylmethoxydiethoxysilane,
N-(cyclohexyl)-3-aminopropylmethoxydiethoxysilane,
bis-(3-methoxydiethoxysilpropyl)amine,
bis-(3-methoxydiethoxysilyl-2-methylpropyl)amine and
N-(3-methoxydiethoxysilylpropyl)-3-amino-2-methyl-propylmethoxydiethoxysilane,
2-(methoxydiethoxysilanylmethyl-amino)-succinic acid dimethyl ester,
2-(methoxydiethoxysilanylmethyl-amino)-succinic acid diethyl ester,
2-(methoxydiethoxysiianylmethyl-amino)-succinic acid dibutyl ester,
2-(methoxydiethoxysilanyl-ethylamino)-succinic acid dimethyl ester,
2-(methoxydiethoxysilanyl-propylamino)-succinic acid dimethyl ester,
2-(methoxydiethoxysilanyl-propylamino)-succinic acid diethyl ester,
2-(methoxydiethoxysilanyl-propylamino)-succinic acid dibutyl ester,
ureidomethylmethoxydiethoxysilane,
2-ureidoethylmethoxydiethoxysilane,
3-ureidopropylmethoxydiethoxysilane,
6-ureidohexylmethoxydiethoxysilane,
isocyanatomethylmethoxydiethoxysilane,
2-isocyanatoethylmethoxydiethoxysilane,
3-isocyanatopropylmethoxydiethoxysilane,
3-isocyanatopropylmethoxy-di-n-propoxysilane,
3-isocyanatopropylmethoxy-di-n-butoxysilane,
3-iso cyanatopropylmethoxydiisopropoxysilane,
3-isocyanatopropylmethoxy-di-sec-butoxysilane, and
3-isocyanatopropylmethoxydiisobutoxysilane.

9. A moisture-curable adhesive, sealant or coating composition comprising at least one moisture-curable silylated polymer of claim 1 and at least one additional moisture-containing and/or substantially moisture-free component selected from the group consisting of different polymer, tackifier, gum plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

10. A moisture-curable adhesive, sealant or coating composition comprising at least one moisture-curable silylated polymer of claim 1 and at least one additional moisture-containing and/or substantially moisture-free component selected from the group consisting of different polymer, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

11. A moisture-curable adhesive, sealant or coating composition comprising at least one moisture-curable silylated polymer of claim 2 and at least one additional moisture-containing and/or substantially moisture-free component selected from the group consisting of different polymer, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

12. A moisture-curable adhesive, sealant or coating composition comprising at least one moisture-curable silylated polymer of claim 3 and at least one additional moisture-containing and/or substantially moisture-free component selected from the group consisting of different polymer, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

13. A moisture-curable adhesive, sealant or coating composition comprising at least one moisture-curable silylated polymer of claim 4 and at least one additional moisture-containing and/or substantially moisture-free component selected from the group consisting of different polymer, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

14. A moisture-curable adhesive, sealant or coating composition comprising at least one moisture-curable silylated polymer of claim 5 and at least one additional moisture-containing and/or substantially moisture-free component selected from the group consisting of different polymer, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

15. A moisture-curable adhesive, sealant or coating composition comprising at least one moisture-curable silylated polymer of claim 1 and at least one additional moisture-containing and/or substantially moisture-free component selected from the group consisting of different polymer, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

16. A moisture-curable adhesive, sealant or coating composition comprising at least one moisture-curable silylated polymer of claim 6 and at least one additional moisture-containing and/or substantially moisture-free component selected from the group consisting of different polymer, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

17. A moisture-curable adhesive, sealant or coating composition comprising at least one moisture-curable silylated polymer of claim 7 and at least one additional moisture-containing and/or substantially moisture-free component selected from the group consisting of different polymer, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

18. A moisture-curable adhesive, sealant or coating composition comprising at least one moisture-curable silylated polymer of claim 8 and at least one additional moisture-containing and/or substantially moisture-free component selected from the group consisting of different polymer, tackifier, gum, plasticizer, filler, surfactant, organic solvent, thixotropic agent, particulate material, moisture scavenger, isocyanate scavenger, crosslinker, adhesion promoter, U.V. stabilizer, catalyst, filler and antioxidant.

\* \* \* \* \*